United States Patent
Ura

(10) Patent No.: US 10,257,413 B2
(45) Date of Patent: Apr. 9, 2019

(54) DISPLAY CONTROL APPARATUS TO PERFORM PREDETERMINED PROCESS ON CAPTURED IMAGE

(71) Applicant: CASIO COMPUTER CO., LTD., Shibuya-ku, Tokyo (JP)

(72) Inventor: Kazuo Ura, Tokyo (JP)

(73) Assignee: CASIO COMPUTER CO., LTD., Tokyo (JP)

(\*) Notice: Subject to any disclaimer, the term of this patent is extended or adjusted under 35 U.S.C. 154(b) by 166 days.

(21) Appl. No.: 15/190,290

(22) Filed: Jun. 23, 2016

(65) Prior Publication Data
US 2017/0064196 A1   Mar. 2, 2017

(30) Foreign Application Priority Data
Aug. 31, 2015   (JP) ................. 2015-170802

(51) Int. Cl.
*G06F 3/01* (2006.01)
*G06F 3/0346* (2013.01)
(Continued)

(52) U.S. Cl.
CPC ..... *H04N 5/23219* (2013.01); *G02B 27/0172* (2013.01); *G06F 3/012* (2013.01);
(Continued)

(58) Field of Classification Search
CPC .................................................. G02B 27/017
See application file for complete search history.

(56) References Cited

U.S. PATENT DOCUMENTS 6,307,526 B1 * 10/2001 Mann ................. G02B 27/017
345/7
7,664,598 B2   2/2010 Yamamoto et al.
(Continued)

FOREIGN PATENT DOCUMENTS

CN    1865849 A    11/2006
JP    2004088395 A    3/2004
(Continued)

OTHER PUBLICATIONS

Chinese Office Action dated Dec. 5, 2018 (and English translation thereof) issued in counterpart Chinese Application No. 201610554780.3.

*Primary Examiner* — Paulos M Natnael
(74) *Attorney, Agent, or Firm* — Holtz, Holtz & Volek PC

(57) ABSTRACT

A display control apparatus includes a plurality of image capture units, an output unit, a behavior detection unit, a situation detection unit, a display image generation unit, and a display control unit. The image capture units capture images in different directions. The output unit can be recognized visually by a person wearing the display control apparatus. The behavior detection unit or the situation detection unit detects behavior of the person or a moving situation of an image of a subject in a plurality of captured images captured by the image capture units. The display image generation unit and the display control unit execute control to produce an output so as to make a switch to any of the captured images captured by the image capture units, and display the switched captured image on the output unit in response to the behavior of the person or the moving situation of the image of the subject detected by the behavior detection unit or the situation detection unit.

10 Claims, 11 Drawing Sheets

(51) Int. Cl.
  *G06K 9/00* (2006.01)
  *G09G 5/14* (2006.01)
  *H04N 7/18* (2006.01)
  *G02B 27/01* (2006.01)
  *H04N 5/232* (2006.01)
  *G06T 11/00* (2006.01)

(52) U.S. Cl.
  CPC ....... G06F 3/0346 (2013.01); G06K 9/00771 (2013.01); G06T 11/00 (2013.01); G09G 5/14 (2013.01); H04N 5/23238 (2013.01); H04N 7/181 (2013.01); *G02B 2027/014* (2013.01); *G02B 2027/0138* (2013.01); *G09G 2340/0492* (2013.01); *G09G 2340/14* (2013.01); *G09G 2354/00* (2013.01); *G09G 2380/10* (2013.01)

(56) References Cited

U.S. PATENT DOCUMENTS

| | | | |
|---|---|---|---|
| 7,734,417 | B2 | 6/2010 | Chinomi et al. |
| 8,446,457 | B2* | 5/2013 | Theobald ........... H04N 5/23238 348/36 |
| 9,787,895 | B2* | 10/2017 | Rekimoto ............. H04N 5/225 |
| 9,898,868 | B2* | 2/2018 | Aonuma ............... G06T 19/006 |
| 2005/0207487 | A1* | 9/2005 | Monroe ........... G08B 13/19628 375/240.01 |
| 2006/0055764 | A1* | 3/2006 | Gal .................. G08B 13/19619 347/109 |
| 2007/0003108 | A1 | 1/2007 | Chinomi et al. |
| 2009/0021583 | A1* | 1/2009 | Salgar .................... H04N 7/181 348/159 |
| 2014/0225812 | A1* | 8/2014 | Hosoya ................ G02B 27/017 345/8 |
| 2015/0188632 | A1* | 7/2015 | Aoyama ............. H04B 10/116 398/118 |
| 2016/0026867 | A1* | 1/2016 | Wexler ................ H04N 5/2257 382/103 |
| 2016/0133051 | A1* | 5/2016 | Aonuma ............... G06T 19/006 345/633 |
| 2016/0191159 | A1* | 6/2016 | Aoyama ............. H04N 21/436 398/172 |
| 2016/0284048 | A1* | 9/2016 | Rekimoto ............. H04N 5/225 |
| 2016/0301865 | A1* | 10/2016 | Rekimoto ............. H04N 5/225 |
| 2017/0031452 | A1* | 2/2017 | Isayama ................. G06F 3/013 |
| 2017/0237488 | A1* | 8/2017 | Aoyama ............. H04B 10/116 398/118 |

FOREIGN PATENT DOCUMENTS

| | | |
|---|---|---|
| JP | 2011145730 A | 7/2011 |
| JP | 2013250600 A | 12/2013 |
| WO | 2006080344 A1 | 8/2006 |

* cited by examiner

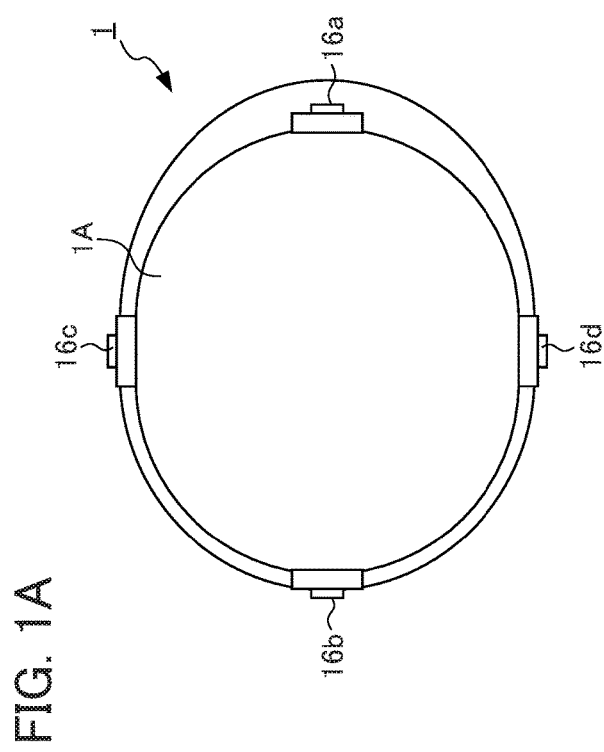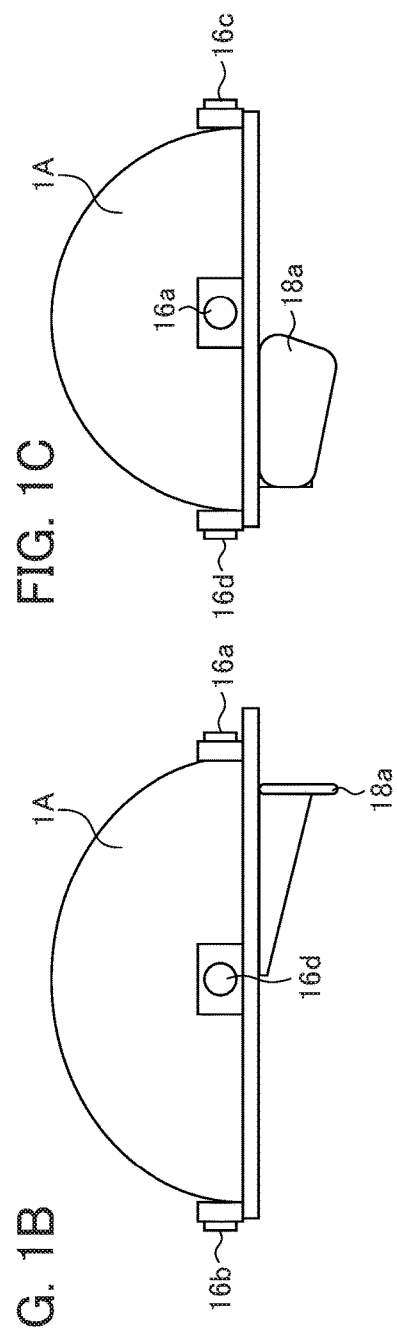

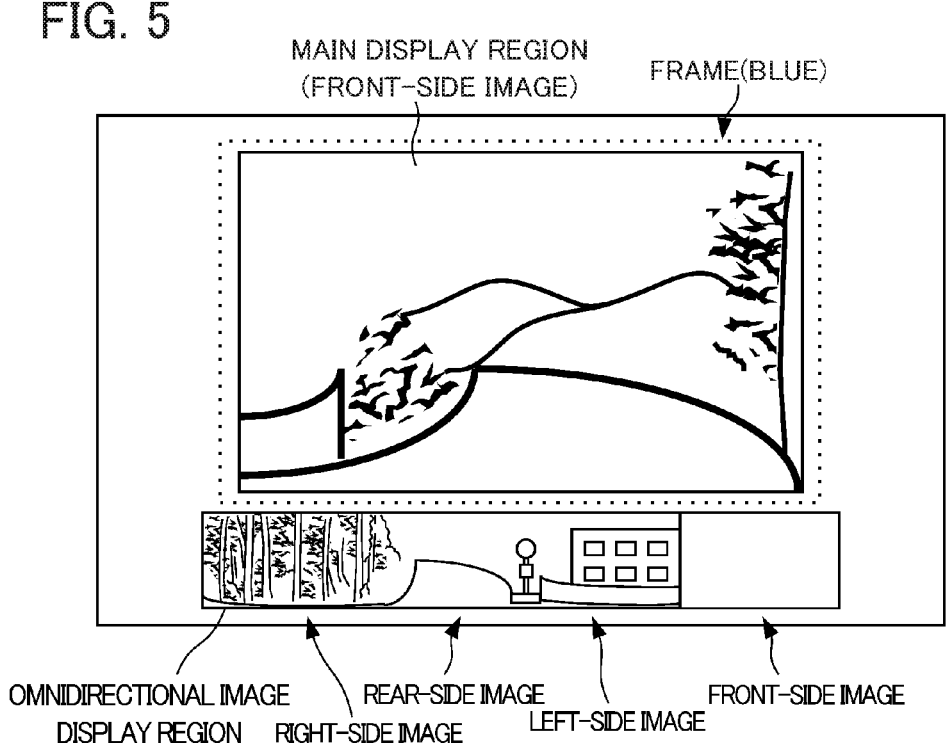
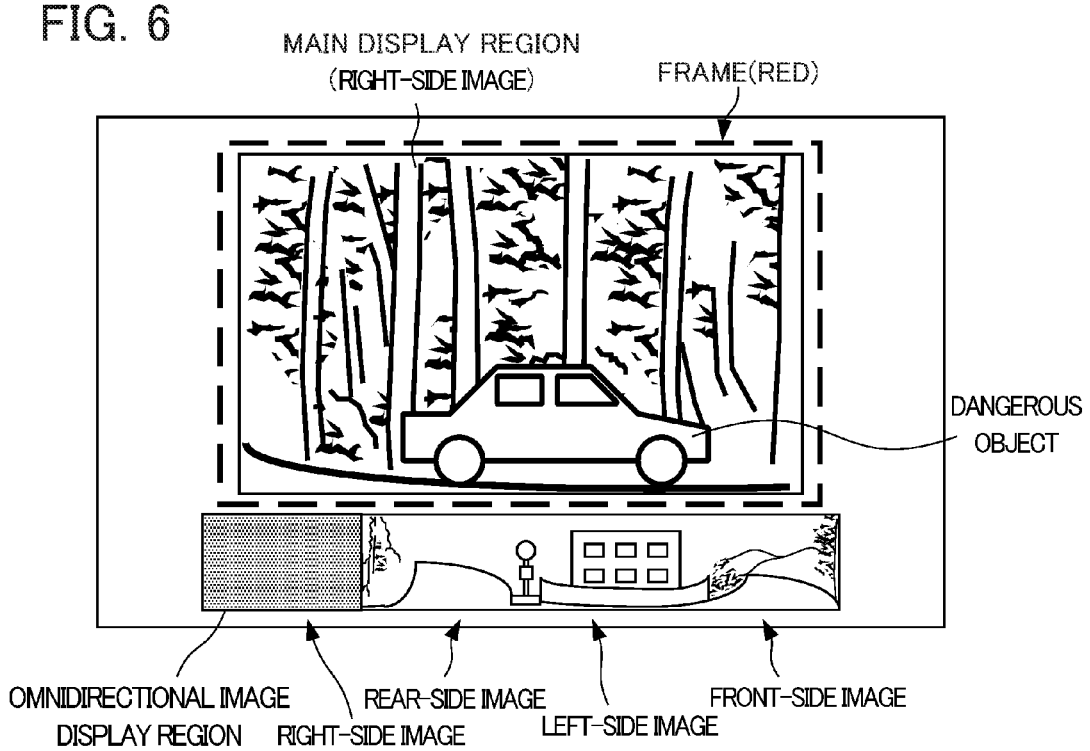

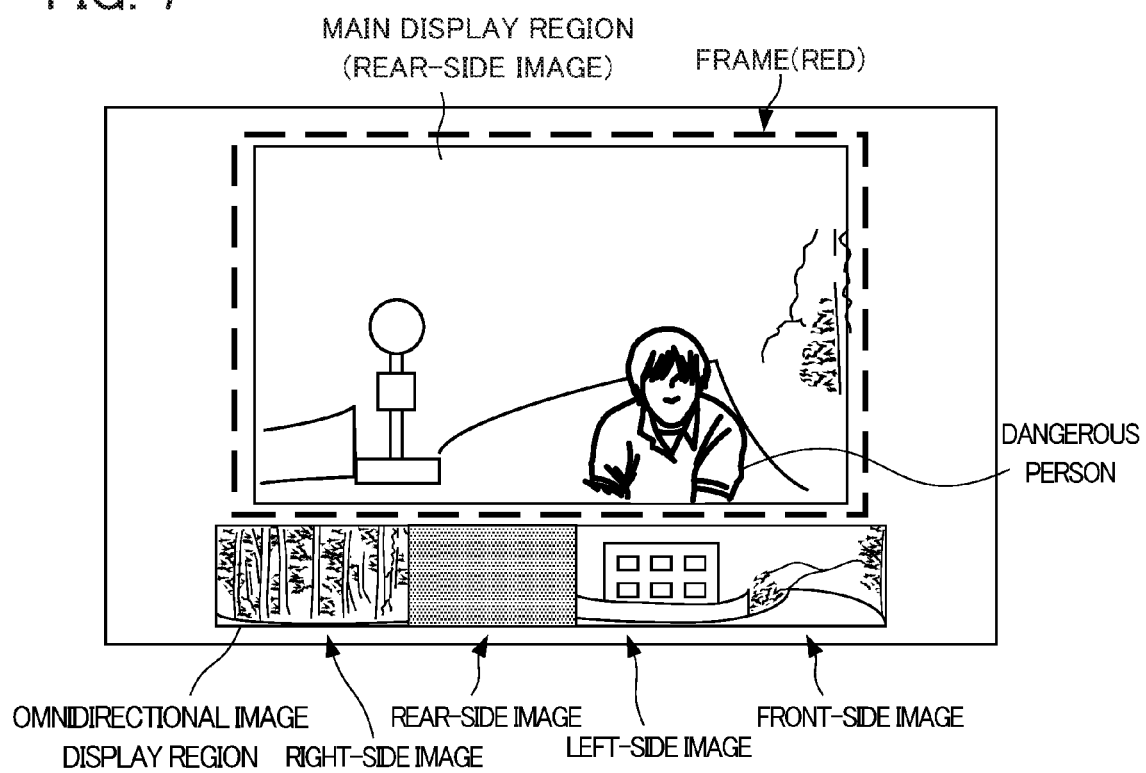

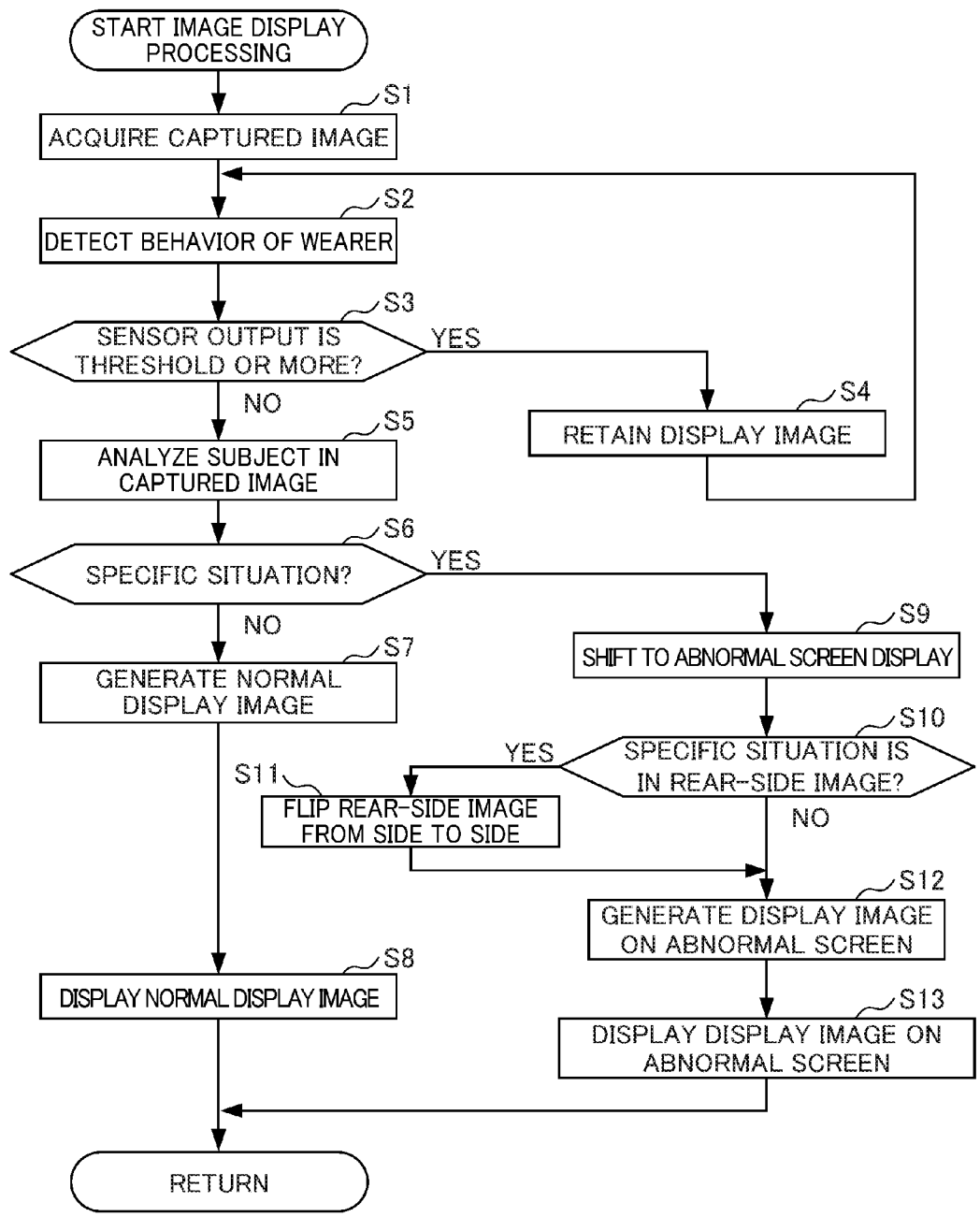

DISPLAY CONTROL APPARATUS TO PERFORM PREDETERMINED PROCESS ON CAPTURED IMAGE

This application is based on and claims the benefit of priority from Japanese Patent Application No. 2015-170802, filed on 31 Aug. 2015, the content of which is incorporated herein by reference.

BACKGROUND OF THE INVENTION

Field of the Invention

The present invention relates to a display control apparatus, a display control method, and a storage medium.

Related Art

A surveillance camera, having conventionally been installed on limited places such as important facilities, has been installed on wider areas such as stations or places in the cities where general people pass through. A larger number of surveillance cameras extends a range of surveillance. However, this in turn increases a burden on a watcher. According to a technique widely known, under surveillance with a plurality of surveillance cameras, displays on these surveillance cameras are switched to image from a camera having detected a suspicious person. As disclosed in Japanese Patent Application Publication No. 2011-145730, there has also been a technique of making a switch to a display on a surveillance camera existing in a moving direction of a suspicious person.

SUMMARY OF THE INVENTION

To achieve the aforementioned object, a display control apparatus according to one aspect of the present invention comprises:

a display unit that changes a direction of a display thereon in a linkage relationship with behavior of a person to a direction that allows visual recognition by the person; and a processor that is configured to:

acquire a plurality of captured images in different image capture directions that change in a linkage relationship with the behavior of the person;

detect the behavior of the person or a moving situation of an image of a subject in the acquired captured images; and execute control to produce an output so as to make a switch to any of the acquired captured images, and display the switched captured image on the display unit in response to the detected behavior of the person or the detected moving situation of the image of the subject.

To achieve the aforementioned object, a display control method according to one aspect of the present invention comprises:

acquiring a plurality of captured images in different image capture directions that change in a linkage relationship with behavior of a person;

detecting the behavior of the person or a moving situation of an image of a subject in the captured images acquired by the acquiring; and display controlling to produce an output so as to make a switch to any of the captured images acquired by the acquiring, and display the switched captured image on a display unit in response to the behavior of the person or the moving situation of the image of the subject detected by the detecting, the display unit changing a direction of a display thereon in a linkage relationship with the behavior of the person to a direction that allows visual recognition by the person.

To achieve the aforementioned object, a computer-readable non-transitory storage medium according to one aspect of the present invention causes a computer to implement:

an acquiring function of acquiring a plurality of captured images in different image capture directions that change in a linkage relationship with behavior of a person;

a detecting function of detecting the behavior of the person or a moving situation of an image of a subject in the captured images acquired by the acquiring function; and a display controlling function of executing control to produce an output so as to make a switch to any of the captured images acquired by the acquiring function, and display the switched captured image on a display unit in response to the behavior of the person or the moving situation of the image of the subject detected by the detecting function, the display unit changing a direction of a display thereon in a linkage relationship with the behavior of the person to a direction that allows visual recognition by the person.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

When the following detailed description is considered together with the drawings below, deeper understanding of the present application is obtainable.

FIGS. 1A, 1B, and 1C are a top view, a right-side view, and a front view respectively forming a schematic view showing the structure of the appearance of a display control apparatus according to an embodiment of the present invention.

FIG. 5 is a schematic view showing an example of a display image generated by an image processor.

FIG. 6 is a schematic view showing an example of a display image responsive to input of a specific situation notification signal.

FIG. 7 is a schematic view showing an example of a display image responsive to input of the specific situation notification signal indicating a rear-side image.

FIG. 8 is a flowchart showing a flow of image display processing executed by the display control apparatus of FIGS. 1A to 10 having the functional structure of FIG. 3.

DETAILED DESCRIPTION OF THE INVENTION

Figure 2:
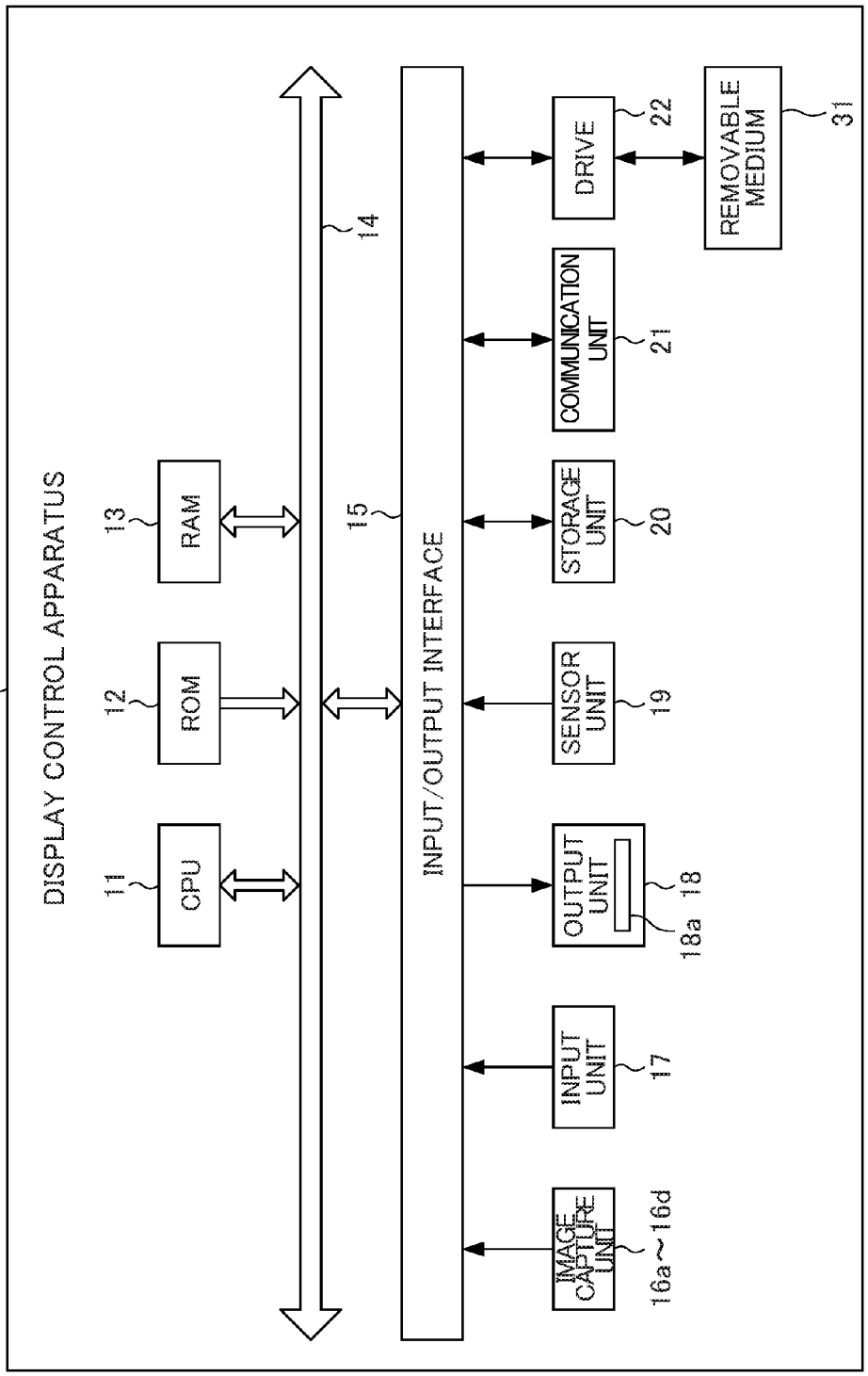
FIG. 2 is a block diagram showing the structure of hardware of the display control apparatus according to the embodiment of the present invention.

Embodiments of the present invention are described below using the drawings.

[First Embodiment]
[Structure]

FIGS. 1A, 1B, and 1C are a top view, a right-side view, and a front view respectively forming a schematic view showing the structure of the appearance of a display control apparatus 1 according to an embodiment of the present invention.

The display control apparatus 1 is configured as a head-mounted display, for example.

In the present embodiment, the display control apparatus 1 is configured as a light-transmitting head-mounted display (optical see-through system) and employs a compact projector system of projecting an image displayed by using liquid crystal in a display region formed of a half mirror. The display control apparatus 1 of this system, which uses the half mirror for forming the display region, allows a user to visually recognize external scenery directly while an image is not projected on the display region.

As shown in FIGS. 1A to 1C, the display control apparatus 1 has an appearance including a helmet-type body 1A, image capture units 16a to 16d that capture an image of a front side, that of a rear-side, that of a left side, and that of a right side in a predetermined frame period, and a display 18a that covers one eye (here, right eye) of a wearer.

The image capture unis 16a to 16d are each formed of a camera that captures an image of scenery around the wearer. The image capture unit 16a captures an image of a front side, the image capture unit 16b captures an image of a rear-side, the image capture unit 16c captures an image of a left side, and the image capture unit 16d captures an image of a right side relative to the orientation of the head of the wearer. Images captured by the image capture units 16a to 16d can be shot as real-time moving images as scenery around the wearer, or can be shot as still images of a particular instant.

The display 18a includes a half mirror. An image projected from a liquid crystal display element of an output unit 18 described later is reflected on the half mirror and then recognized visually by the wearer. If an image projected from the liquid crystal display element is not projected on the half mirror of the display 18a, extraneous light having passed through the display 18a is recognized visually by the wearer.

The display control apparatus 1 may have an alternative structure where an eyeglass-type unit with the display 18a is configured as a unit different from a helmet-type unit with the body 1A and the image capture units 16a to 16d, and these units are connected via wire communication or radio communication.

[Hardware Structure]

FIG. 2 is a block diagram showing the structure of hardware of the display control apparatus 1 according to the embodiment of the present invention.

The display control apparatus 1 includes a central processing unit (CPU) 11, a read only memory (ROM) 12, a random access memory (RAM) 13, a bus 14, an input/output interface 15, the image capture units 16a to 16d, an input unit 17, an output unit 18, a sensor unit 19, a storage unit 20, a communication unit 21, and a drive 22. These hardware pieces of the display control apparatus 1 can be incorporated in the body 1A.

Alternatively, if the eyeglass-type unit with the display 18a is formed, these hardware pieces can be incorporated in a temple of this unit.

The CPU 11 executes various processing in accordance with a program recorded in the ROM 12, or a program loaded from the storage unit 20 into the RAM 13.

Data, etc. required upon the CPU 11 executing the various processing is stored in the RAM 13 as appropriate.

The CPU 11, ROM 12 and RAM 13 are connected to each other via the bus 14. The input/output interface 15 is also connected to this bus 14. The image capture unit 16, input unit 17, output unit 18, sensor unit 19, storage unit 20, communication unit 21 and drive 22 are connected to the input/output interface 15.

Although not illustrated, each of the image capture unit 16a to 16d includes an optical lens unit and image sensor.

In order to photograph a subject, the optical lens unit is configured by lenses condensing light such as a focus lens and zoom lens, for example. The focus lens is a lens for forming an image of a subject on the light receiving surface of the image sensor. The zoom lens is a lens that allows the focal length to freely change in a certain range. The optical lens unit also includes peripheral circuits to adjust setting parameters such as focus, exposure and white balance, as necessary.

The optoelectronic conversion device is configured by a CMOS (Complementary Metal Oxide Semiconductor) type of optoelectronic conversion device and the like, for example.

Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the accumulated image signal as an analog signal to the AFE.

The AFE executes a variety of signal processing such as A/D (Analog/Digital) conversion processing on this analog image signal. The variety of signal processing generates a digital signal that is output as an output signal from each of the image capture unit 16a to 16d. Such an output signal of each of the image capture unit 16a to 16d is hereinafter referred to as "captured image".

The input unit 17 is formed of various buttons, for example. In response to an instruction operation by a user, various types of information are input through the input unit 17. The input unit 17 can be incorporated directly in the display control apparatus 1. Alternatively, the display control apparatus 1 can be configured to be remote-controlled by an electronic device such as a smartphone and the function of the input unit 17 can be incorporated in the electronic device.

The output unit 18 includes the display 18a. As described above, the output unit 18 is configured in such a manner that an image projected from the liquid crystal display element not shown in the drawings is reflected on the half mirror of the display 18a and the image reflected on the half mirror is recognized visually by a wearer. The output unit 18 may include a speaker to output voice.

The sensor unit 19 includes a gyroscope sensor and an acceleration sensor. The sensor unit 19 detects behavior of the wearer (more specifically, change in the orientation of a head or movement of the head). The sensor unit 19 may include a position sensor such as a GPS or a sensor to measure ambient environment (such as a temperature sensor or an air pressure sensor) to detect a current position or ambient environment of the wearer.

The storage unit 20 is configured by a hard disk, DRAM (Dynamic Random Access Memory), etc., and stores the data of various images. The communication unit 21 controls communication performed with another apparatus (not illustrated) via a network including the Internet.

Removable medium 31, made from a magnetic disk, optical disk, magneto-optical disk, semiconductor memory or the like, is installed in the drive 22 as appropriate. Programs read from the removable medium 31 by the drive 22 are installed in the storage unit 20 as necessary. In addition, the removable media 31 can store various data such as the data of images stored in the storage unit 20 in a similar way to the storage unit 20.

[Functional Structure]

Figure 3:
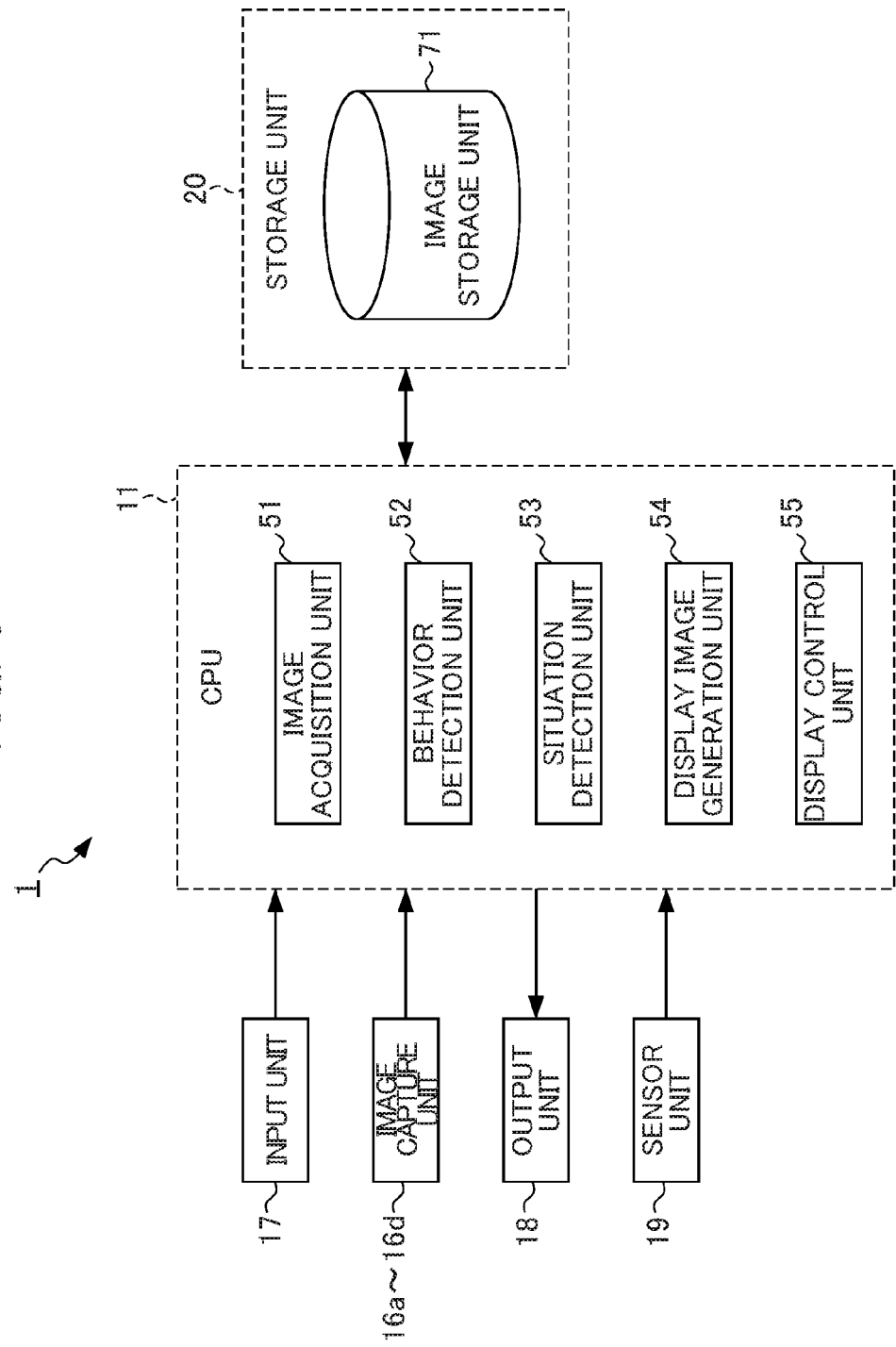
FIG. 3 is a functional block diagram showing a functional structure belonging to the functional structure of the display control apparatus shown in FIGS. 1A to 1C and being intended to execute image display processing.

FIG. 3 is a functional block diagram showing a functional structure belonging to the aforementioned functional structure of the display control apparatus 1 and being intended to execute image display processing.

The image display processing means a series of processes of processing an image of a front side, that of a rear side, that of a left side, and that of a right side relative to a wearer captured by the image capture units 16a to 16d into a format that allows a wearer to grasp an ambient situation easily and displaying the processed images.

As shown in FIG. 3, to execute the image display processing, an image acquisition unit 51, a behavior detection unit 52, a situation detection unit 53, a display image generation unit 54, and a display control unit 55 become functional in the CPU 11.

An image storage unit 71 is defined in one region of the storage unit 20.

The image storage unit 71 stores an image selected according to a preset condition such as data about an image (a still image or moving images) at the time of detection of abnormality by the situation detection unit 53. The image storage unit 71 further stores captured images captured for a predetermined length of time (five seconds, for example) output from the image capture units 16a to 16d.

The image acquisition unit 51 acquires a captured image output from each of the image capture units 16a to 16d and stores the captured image into the image storage unit 71. At this time, the image acquisition unit 51 acquires a captured image output from the image capture unit 16a as a front-side image resulting from image capture of a front side relative to the orientation of the head of a wearer and acquires a captured image output from the image capture unit 16b as a rear-side image resulting from image capture of a rear side relative to the orientation of the head of the wearer. Likewise, the image acquisition unit 51 acquires a captured image output from the image capture unit 16c as a left-side image resulting from image capture of a left side relative to the orientation of the head of the wearer and acquires a captured image output from the image capture unit 16d as a right-side image resulting from image capture of a right side relative to the orientation of the head of the wearer.

Figure 4:
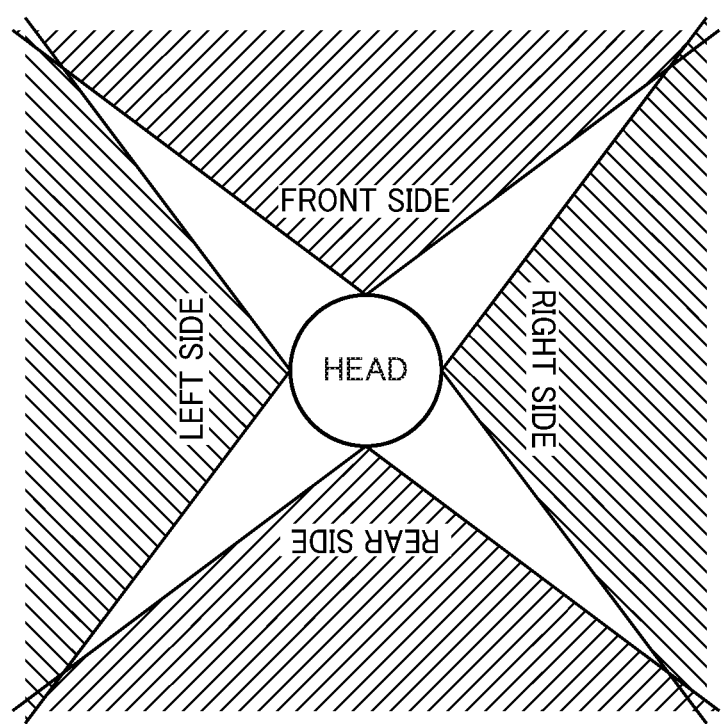
FIG. 4 is a schematic view showing the angle of view of a captured image output from each image capture unit.

FIG. 4 is a schematic view showing the angle of view of a captured image output from each image capture unit.

As shown in FIG. 4, the angle of view of a front-side image, that of a rear-side image, that of a left-side image, and that of a right-side image captured by the image capture units 16a to 16d respectively are set so as to cover the entire periphery of a wearer.

Thus, an image of an object existing in the periphery of the wearer is captured by at least one of the image capture units 16a to 16d.

The behavior detection unit 52 acquires a sensor output from the sensor unit 19 and detects behavior of a wearer based on the acquired sensor output. More specifically, the behavior detection unit 52 detects change in the orientation of the head of the wearer based on an output from the gyroscope sensor and detects behavior of the wearer based on an output from the acceleration sensor. Then, the behavior detection unit 52 determines whether or not the wearer exhibits sudden behavior (specifically, whether or not change in a sensor output is a threshold or more). If determining that the wearer exhibits sudden behavior, the behavior detection unit 52 outputs a signal to the display image generation unit 54 indicating that change in the orientation of the wearer is temporary (this signal is hereinafter called a "temporary change notification signal"). If determining that the wearer is no longer in a state of exhibiting the sudden behavior, the behavior detection unit 52 outputs a release signal to the display image generation unit 54 for releasing the temporary change notification signal.

The situation detection unit 53 detects a specific situation occurring at a subject of captured images output from the image capture units 16a to 16d. More specifically, in each of the captured images output from the image capture units 16a to 16d, the situation detection unit 53 detects the existence and movement of a person suspected to be dangerous (hereinafter called a "dangerous person") or an object suspected to be dangerous (hereinafter called a "dangerous object"). For example, the situation detection unit 53 detects a situation where a person registered as a dangerous person or a person not registered as a reliable person is approaching a wearer, or a situation where an automobile as a dangerous object moving at high speed is approaching the wearer. If a specific situation at the subject is detected, the situation detection unit 53 outputs a signal to the display image generation unit 54 indicating a captured image including the detected specific situation occurring at the subject (this signal is hereinafter called a "specific situation notification signal").

The display image generation unit 54 generates a display image to be projected on the display 18a based on captured images output from the image capture units 16a to 16d and stored in the image storage unit 71. More specifically, the display image generation unit 54 generates a display image by arranging a front-side image in a main display region at the center, and arranging the front-side image, a rear-side image, a left-side image, and a right-side image in a transverse direction in an omnidirectional image display region below the main display region. In the present embodiment, the display image generation unit 54 generates a display image where a 360-degree panoramic image formed by combining the front-side image, the rear-side image, the left-side image, and the right-side image is arranged in the omnidirectional image display region. To identify a part of the omnidirectional image display region (panoramic image) corresponding to a captured image displayed in the main display region, the display image generation unit 54 makes this part blank to show that the corresponding captured image is displayed in the main display region.

FIG. 5 is a schematic view showing an example of a display image generated by the display image generation unit 54.

In the example shown in FIG. 5, the main display region where a front-side image is displayed and the omnidirectional image display region below the main display region are arranged in a region of the half mirror of the display 18a. The main display region is surrounded by a frame in color (here, blue) showing a normal display state. The periphery of the main display region and the omnidirectional image display region shows scenery visually recognized as a result of passing of extraneous light (scenery that can be viewed with naked eyes).

If the temporary change notification signal is input from the behavior detection unit 52, the display image generation unit 54 retains an image in the main display region and an image in the omnidirectional image display region to make a temporary halting state. If a release signal for releasing the temporary change notification signal is input from the behavior detection unit 52, the display image generation unit 54 finishes the state of retaining the images in the main display region and the omnidirectional image display region to display a front-side image in the main display region as normal.

In this way, reduction in viewability can be prevented which will occur if a wearer exhibits sudden behavior such as turning around to the left or right to switch an image in the main display region and an image in the omnidirectional image display region frequently.

If the specific situation notification signal is input from the situation detection unit 53, the display image generation unit 54 generates a display image where a captured image in the omnidirectional image display region including a detected specific situation occurring at a subject is arranged in the main display region. At this time, to identify a part of the omnidirectional image display region corresponding to the captured image displayed in the main display region, the display image generation unit 54 makes this part blank to show that the corresponding captured image is displayed in the main display region. In this case, to show that this captured image is displayed in the main display region in response to input of the specific situation notification signal, the display image generation unit 54 generates a display image in a state distinguished from a normal display state by surrounding the main display region by a red frame and displaying the blank part of the omnidirectional image display region in red, for example.

FIG. 6 is a schematic view showing an example of a display image responsive to input of the specific situation notification signal.

In the example shown in FIG. 6, a specific situation (an automobile as a dangerous object) at a subject is detected in a right-side image. The right-side image is displayed in the main display region and is surrounded by a red frame. Further, a part of the omnidirectional image display region corresponding to the right-side image is blank and displayed in red. The same processing is executed if a specific situation at a subject is detected in a left-side image.

If the specific situation notification signal indicating that a captured image including a detected specific situation occurring at a subject is a rear-side image is input, the display image generation unit 54 generates a display image where the rear-side image is arranged in the main region while being flipped from side to side, the rear-side image flipped from side to side is surrounded by a red frame, and a part of the omnidirectional image display region corresponding to the rear-side image is blank and displayed in red.

FIG. 7 is a schematic view showing an example of a display image responsive to input of the specific situation notification signal indicating a rear-side image.

In the example shown in FIG. 7, a specific situation (a dangerous person) at a subject is detected in the rear-side image. The rear-side image is displayed in the main display region while being flipped from side to side and is surrounded by a red frame. Further, a part of the omnidirectional image display region corresponding to the rear-side image is blank and displayed in red.

As described above, by flipping a rear-side image from side to side and displaying the flipped rear-side image in the main display region, a wearer can intuitively understand which one of a right side and a left side the wearer should watch out for, even if the right side and the left side are on a rear side of the wearer.

The display control unit 55 projects a display image generated by the display image generation unit 54 from the liquid crystal display element of the output unit 18 and displays the display image on the half mirror of the display 18a.

[Operation]

Operation is described next.

FIG. 8 is a flowchart showing a flow of image display processing executed by the display control apparatus 1 of FIGS. 1A to 10 having the functional structure of FIG. 3.

The image display processing is started in response to operation to start the image display processing performed by a user through the input unit 17. After the start, each time the image capture units 16a to 16d capture images in a predetermined frame period, the image display processing is executed repeatedly.

In step S1, the image acquisition unit 51 acquires a captured image output from each of the image capture units 16a to 16d relative to an orientation at the start of the image display processing.

In step S2, the behavior detection unit 52 acquires a sensor output from the sensor unit 19 and detects behavior of a wearer based on the acquired sensor output.

In step S3, the behavior detection unit 52 determines whether or not change in the sensor output is a threshold or more. At the start of the image display processing, the behavior detection unit 52 determines that a result is NO.

If the change in the sensor output is the threshold or more, a result of the determination in step S3 is YES and the processing shifts to step S4.

If the change in the sensor output is not the threshold or more, a result of the determination in step S3 is NO and the processing shifts to step S5.

In step S4, the display image generation unit 54 retains a display image (an image in the main display region and an image in the omnidirectional image display region) in response to the temporary change notification signal input from the behavior detection unit 52 to make a temporary halting state. After step S4, the processing shifts to step S2.

In step S5, the situation detection unit 53 analyzes a subject in the captured images output from the image capture units 16*a* to 16*d*.

In step S6, the situation detection unit 53 detects a specific situation occurring at the subject of the captured images output from the image capture units 16*a* to 16*d*. For example, the situation detection unit 53 detects a situation where a person registered as a dangerous person or a person not registered as a reliable person is approaching the wearer, or a situation where an automobile as a dangerous object moving at high speed is approaching the wearer.

If a specific situation occurring at the subject of the captured images output from the image capture units 16*a* to 16*d* is not detected, a result of the determination in step S6 is NO and the processing shifts to step S7.

Meanwhile, if a specific situation occurring at the subject of the captured images output from the image capture units 16*a* to 16*d* is detected, a result of the determination in step S6 is YES and the situation detection unit 53 provides the specific situation notification signal to the display image generation unit 54. Then, the processing shifts to step S9.

In step S7, the display image generation unit 54 processes the captured images output from the image capture units 16*a* to 16*d* and generates a normal display image where a front-side image output from the image capture unit 16*a* is displayed in the main display region and a part of the omnidirectional image display region corresponding to the front-side image displayed in the main display region is blank (see FIG. 5).

In step S8, the normal display image generated by the display image generation unit 54 is displayed on the display 18*a* by the display control unit 55.

In step S9, in response to the provision of the specific situation notification signal from the situation detection unit 53, the display image generation unit 54 shifts to screen display (abnormal screen display) responsive to the detection of the specific situation.

In step S10, the display image generation unit 54 determines whether or not a captured image including the detected specific situation is a rear-side image.

If the captured image including the detected specific situation is a rear-side image, a result of the determination in step S10 is YES and the processing shifts to step S11.

If the captured image including the detected specific situation is not a rear-side image, a result of the determination in step S10 is NO and the processing shifts to step S12.

In step S11, the display image generation unit 54 generates an image to be displayed in the main display region by flipping the rear-side image from side to side.

In step S12, the display image generation unit 54 generates a display image where the captured image including the detected specific situation occurring at the subject is arranged in the main display region. At this time, the display image generation unit 54 generates the display image where the main display region is surrounded by a red frame and a part of the omnidirectional image display region in the same direction as the captured image displayed in the main display region is displayed in red.

In step S13, the display control unit 55 makes a switch from a normal display image to the display image on the abnormal screen generated by the display image generation unit 54 and displays the switched display image on the display 18*a*.

Further, an image (a still image or moving images) at the time of detection of the abnormality by the situation detection unit 53 is stored in the image storage unit 71.

After steps S8 and S13, the image display processing is repeated.

As a result of the aforementioned processing, an image of a front side in the omni-direction of a wearer is displayed in the main display region and images in the other directions are displayed in the omnidirectional image display region. At this time, to identify a part of the omnidirectional image display region corresponding to a captured image displayed in the main display region, this part is made blank to show that the corresponding captured image is displayed in the main display region.

Thus, the condition of the omni-direction of the wearer can be displayed in an easy-to-understand format.

If a specific situation is detected, an image in a direction where the specific situation is detected is displayed in the main display region.

At this time, to show the detection of the specific situation, the main display region is surrounded by a red frame and a blank part of the omnidirectional image display region is displayed in red.

Thus, the direction where the specific situation has occurred and the detail of the specific situation can be displayed in an easy-to-understand format.

If the wearer exhibits sudden behavior, an image in the main display region and an image in the omnidirectional image display region are retained to make a temporary halting state.

In this way, reduction in viewability can be prevented which will occur if the wearer exhibits sudden behavior to switch an image in the main display region and an image in the omnidirectional image display region frequently.

As described above, the display control apparatus 1 according to the present embodiment can respond to abnormality more promptly.

Providing an image capture unit to a movable person can increase a degree of freedom in installing the image capture unit for surveillance and respond to influence caused by the movability of the person.

[Second Embodiment]

A second embodiment of the present embodiment is described next.

A display control apparatus 1 of the second embodiment has a structure similar to that of the display control apparatus 1 of the first embodiment and differs from the display control apparatus 1 of the first embodiment in the format of a display image generated by the display image generation unit 54.

Thus, the following description is intended for the structure of the display image generation unit 54 which is different from the first embodiment.

The display image generation unit 54 generates a display image to be projected on the display 18*a* based on captured images output from the image capture units 16*a* to 16*d* and stored in the image storage unit 71. More specifically, the display image generation unit 54 generates a display image by displaying one of a large-size front-side image, rear-side image, left-side image, and right-side image in the main display region at the center, arranging the front-side image of a small size in an upper part of the main display region, arranging the rear-side image of a small size flipped upside down and from side to side (rotated 180 degrees) in a lower part of the main display region, arranging the left-side image of a small size rotated 90 degrees to the left in a left side part of the main display region, and arranging the right-side image of a small size rotated 90 degrees to the right in a right side part of the main display region. In the below, the small-size captured images displayed at the margin of the main display region are collectively called a "marginal image," where appropriate.

Figure 9:
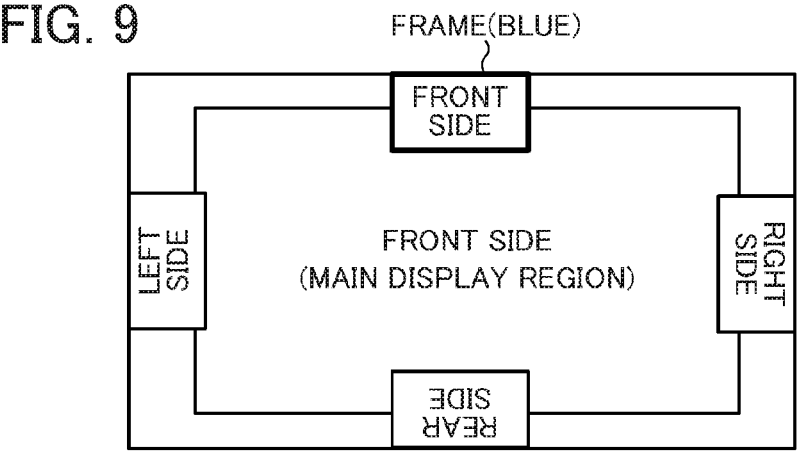
FIG. 9 is a schematic view showing an example of a display image generated by the image processor.

FIG. 9 is a schematic view showing an example of a display image generated by the display image generation unit 54.

In the example shown in FIG. 9, the main display region where a front-side image is displayed is arranged in a region of the half mirror of the display 18a. The front-size image of a small size is arranged in an upper part of the main display region, a rear-side image of a small size is flipped upside down and from side to side and arranged in a lower part of the main display region, a left-side image of a small size is rotated 90 degrees to the left and arranged in a left side part of the main display region, and a right-side image of a small size is rotated 90 degrees to the right and arranged in a right side part of the main display region. A captured image belonging to the marginal image and arranged in the main display region is surrounded by a frame (here, a blue frame) showing that this captured image is arranged in the main display region. The periphery of the main display region shows scenery visually recognized as a result of passing of extraneous light (scenery that can be viewed with naked eyes).

If the temporary change notification signal is input from the behavior detection unit 52, the display image generation unit 54 retains an image in the main display region and the marginal image to make a temporary halting state. If a release signal for releasing the temporary change notification signal is input from the behavior detection unit 52, the display image generation unit 54 finishes the state of retaining the image in the main display region and the marginal image to display a front-side image in the main display region as normal.

In this way, reduction in viewability can be prevented which will occur if a wearer exhibits sudden behavior such as turning around to the left or right to switch an image in the main display region and the marginal image frequently.

If the specific situation notification signal is input from the situation detection unit 53, the display image generation unit 54 generates a display image where a captured image belonging to the marginal image and including a detected specific situation occurring at a subject is arranged in the main display region. At this time, the display image generation unit 54 surrounds the captured image belonging to the marginal image and being displayed in the main display region in response to the specific situation notification signal by a frame (here, a red frame) showing that display of this captured image in the main display region is responsive to input of the specific situation notification signal.

Further, if the specific situation notification signal is input from the situation detection unit 53, the display image generation unit 54 arranges a captured image including a detected specific situation in the main display region while flipping this captured image from side to side in response to a direction of the captured image and a moving direction of a subject. More specifically, if the specific situation notification signal indicating that a captured image including a detected specific situation occurring at a subject is a rear-side image is input, the display image generation unit 54 arranges the rear-side image flipped from side to side in the main display region. If the specific situation notification signal indicating that a captured image including a detected specific situation occurring at the subject is a left-side image or a right-side image is input and a moving direction of the subject is from a rear side toward a front side, the display image generation unit 54 arranges the left-side or right-side image flipped from side to side in the main display region. A moving direction of a subject in a captured image can be detected together with detection of the subject in a specific situation by the situation detection unit 53 and the detected moving direction can be notified to the display image generation unit 54, for example.

As described above, by flipping a captured image including a detected specific situation from side to side in response to a direction of this captured image and a moving direction of a subject and displaying the flipped captured image in the main display region, a wearer can intuitively understand which one of a right side and a left side the wearer should watch out for.

Figure 10:
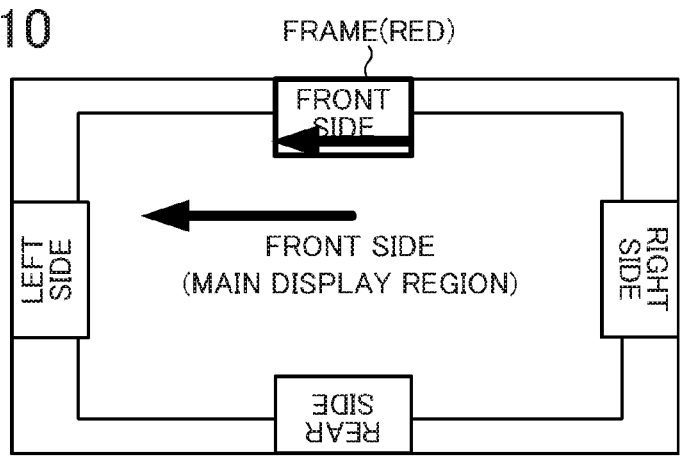
FIG. 10 is a schematic view showing an example of a display image responsive to input of the specific situation notification signal indicating a front-side image.

FIG. 10 is a schematic view showing an example of a display image responsive to input of the specific situation notification signal indicating a front-side image. Arrows in FIGS. 10 to 15 referred to below each show a moving direction of a subject where a specific situation is detected.

In the example shown in FIG. 10, the front-side image is displayed in the main display region while not being flipped from side to side. Further, the front-side image of a small size is surrounded by a red frame showing that the specific situation is detected.

In this case, the subject where the specific situation is detected is on a front side of a wearer, so that a moving direction of the subject in the front-side image matches with the intuition of the wearer. Thus, the image displayed in the main display region is not flipped from side to side.

Figure 11:
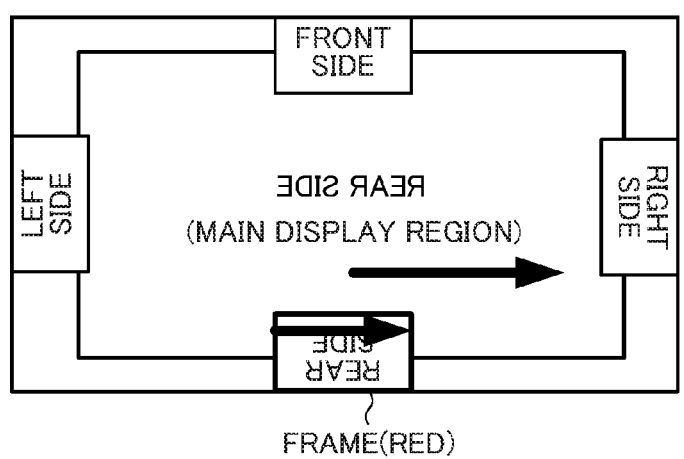
FIG. 11 is a schematic view showing an example of a display image responsive to input of the specific situation notification signal indicating a rear-side image.

FIG. 11 is a schematic view showing an example of a display image responsive to input of the specific situation notification signal indicating a rear-side image.

In the example shown in FIG. 11, the rear-side image is displayed in the main display region while being flipped from side to side. Further, the rear-side image of a small size is surrounded by a red frame showing that a specific situation is detected.

In this case, a subject where the specific situation is detected is on a rear side of a wearer, so that a moving direction of the subject in the rear-side image does not match with the intuition of the wearer. Thus, the image displayed in the main display region is flipped from side to side.

Figure 12:
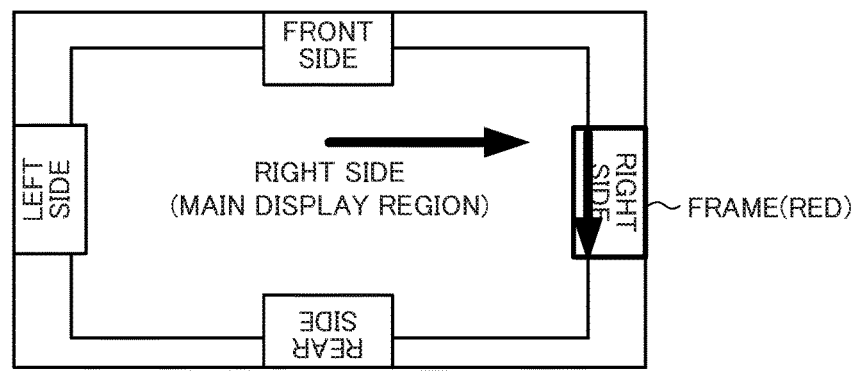
FIG. 12 is a schematic view showing an example of a display image responsive to input of the specific situation notification signal indicating a right-side image and movement from a front side toward a rear side of a subject where a specific situation is detected.

FIG. 12 is a schematic view showing an example of a display image responsive to input of the specific situation notification signal indicating a right-side image and movement from a front side toward a rear side of a subject where a specific situation is detected.

In the example shown in FIG. 12, the right-side image is displayed in the main display region while not being flipped from side to side. Further, the right-side image of a small size is surrounded by a red frame showing that the specific situation is detected.

In this case, a moving direction of the subject where the specific situation is detected is from a front side toward a rear side, so that the moving direction of the subject in the right-side image matches with the intuition of a wearer. Thus, the image displayed in the main display region is not flipped from side to side.

Figure 13:
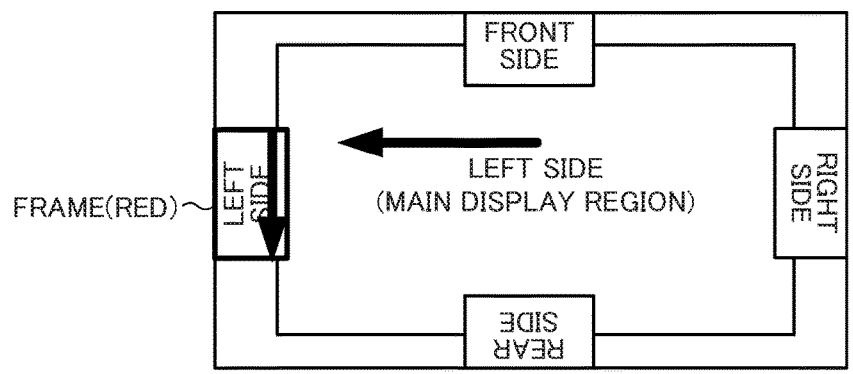
FIG. 13 is a schematic view showing an example of a display image responsive to input of the specific situation notification signal indicating a left-side image and movement from a front side toward a rear side of a subject where a specific situation is detected.

FIG. 13 is a schematic view showing an example of a display image responsive to input of the specific situation notification signal indicating a left-side image and movement from a front side toward a rear side of a subject where a specific situation is detected.

In the example shown in FIG. 13, the left-side image is displayed in the main display region while not being flipped from side to side. Further, the left-side image of a small size is surrounded by a red frame showing that the specific situation is detected.

In this case, a moving direction of the subject where the specific situation is detected is from a front side toward a rear side, so that the moving direction of the subject in the left-side image matches with the intuition of a wearer. Thus, the image displayed in the main display region is not flipped from side to side.

Figure 14:
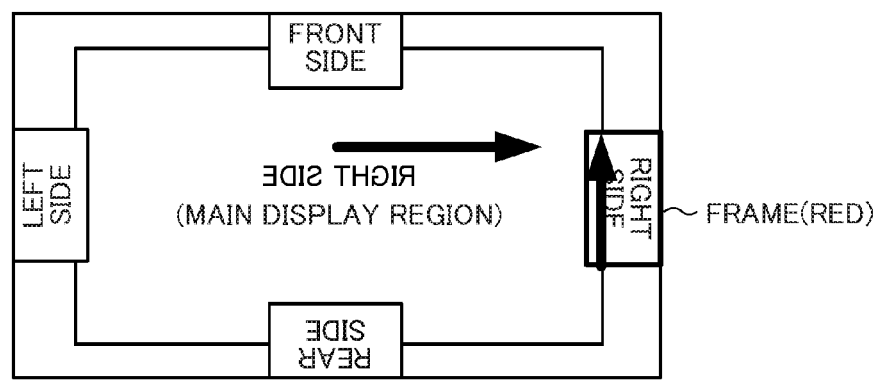
FIG. 14 is a schematic view showing an example of a display image responsive to input of the specific situation notification signal indicating a right-side image and movement from a rear side toward a front side of a subject where a specific situation is detected.

FIG. 14 is a schematic view showing an example of a display image responsive to input of the specific situation notification signal indicating a right-side image and movement from a rear side toward a front side of a subject where a specific situation is detected.

In the example shown in FIG. 14, the right-side image is displayed in the main display region while being flipped from side to side. Further, the right-side image of a small size is surrounded by a red frame showing that the specific situation is detected.

In this case, a moving direction of the subject where the specific situation is detected is from a rear side toward a front side, so that the moving direction of the subject in the right-side image does not match with the intuition of a wearer. Thus, the image displayed in the main display region is flipped from side to side.

Figure 15:
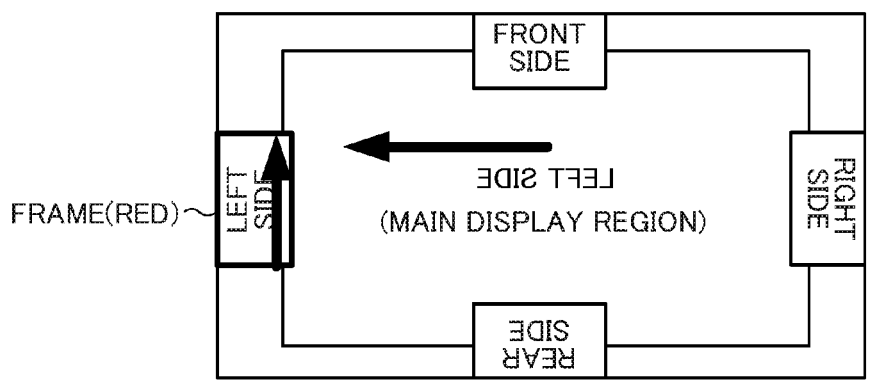
FIG. 15 is a schematic view showing an example of a display image responsive to input of the specific situation notification signal indicating a left-side image and movement from a rear side toward a front side of a subject where a specific situation is detected.

FIG. 15 is a schematic view showing an example of a display image responsive to input of the specific situation notification signal indicating a left-side image and movement from a rear side toward a front side of a subject where a specific situation is detected.

In the example shown in FIG. 15, the left-side image is displayed in the main display region while being flipped from side to side. Further, the left-side image of a small size is surrounded by a red frame showing that the specific situation is detected.

In this case, a moving direction of the subject where the specific situation is detected is from a rear side toward a front side, so that the moving direction of the subject in the left-side image does not match with the intuition of a wearer. Thus, the image displayed in the main display region is flipped from side to side.

As a result of the aforementioned processing, an image of a front side in the omni-direction of a wearer is displayed in the main display region and an image in every direction is displayed as the marginal image arranged around the main display region.

Thus, the condition of the omni-direction of the wearer can be displayed in an easy-to-understand format.

If a specific situation is detected, an image in a direction where the specific situation is detected is displayed in the main display region. At this time, to show the detection of the specific situation, the marginal image displayed in the main display region is surrounded by a red frame.

Thus, the direction where the specific situation has occurred and the detail of the specific situation can be displayed in an easy-to-understand format.

If the wearer exhibits sudden behavior, an image in the main display region and the marginal image are retained to make a temporary halting state.

In this way, reduction in viewability can be prevented which will occur if the wearer exhibits sudden behavior to switch an image in the main display region and the marginal image frequently.

Further, a captured image including a detected specific situation is arranged in the main display region while being flipped from side to side in response to a direction of the captured image and a moving direction of a subject.

This allows the wearer to intuitively understand which one of a right side and a left side the wearer should watch out for.

As described above, the display control apparatus 1 according to the present embodiment can respond to abnormality more promptly.

[First Modification]

In the description of the first embodiment, a front-side image is displayed in the main display region in a normal display state and a display image in the main display region is changed as the occasion arises according to a captured image that is responsive to the orientation of the head of a wearer. Alternatively, a direction of a display in the main display region can be fixed.

More specifically, the display image generation unit 54 generates a panoramic image based on captured images output from the image capture units 16a to 16d, and arranges an image in a fixed direction or in a direction including a specific subject in the main display region irrespective of the orientation of the head of a wearer detected by the behavior detection unit 52. Specifically, the display image generation unit 54 fixes a front side in a display image independently of the orientation of the head of the wearer and displays an image in the fixed direction in the main display region.

Figure 16:
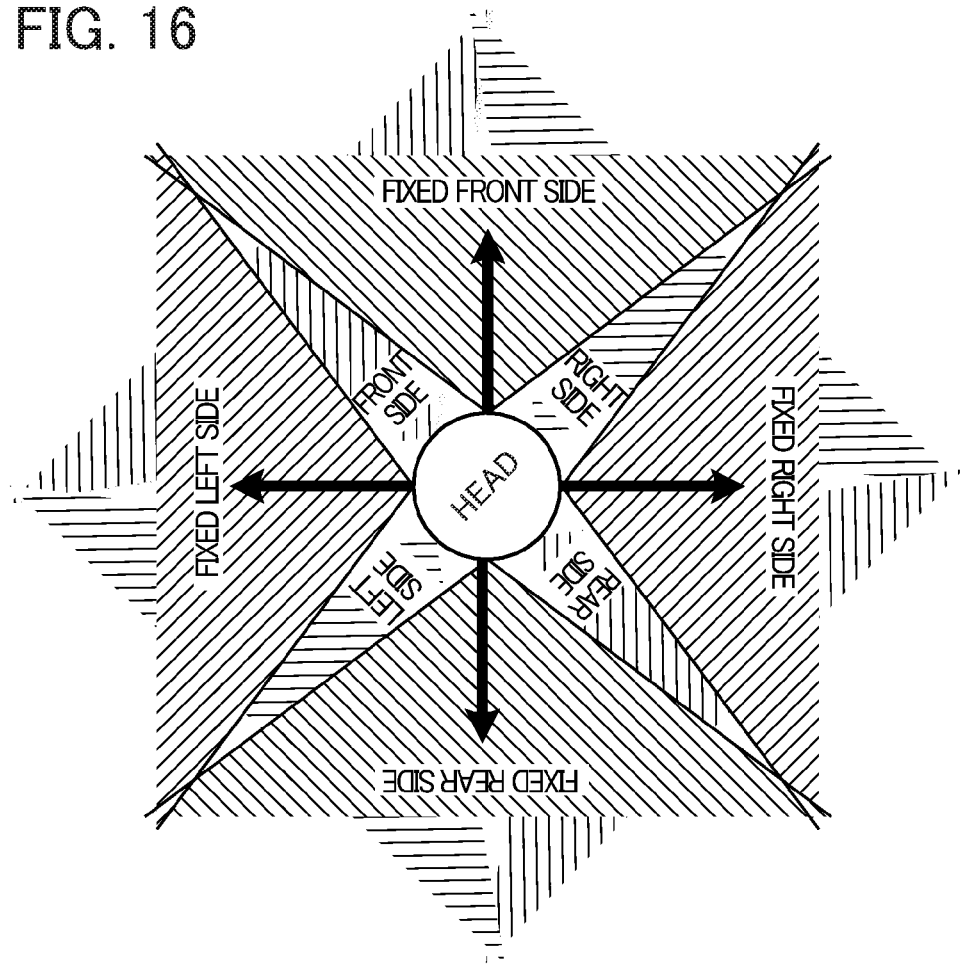
FIG. 16 is a schematic view showing a state where a direction of a display in a main display region is fixed.

FIG. 16 is a schematic view showing a state where a direction of a display in the main display region is fixed.

As shown in FIG. 16, a front side, a rear side, a left side, and a right side (fixed front side, fixed rear side, fixed left side, and fixed right side) in a display image can be set independently of a front-side direction, a rear-side direction, a left-side direction, and a right-side direction determined by the orientation of the head of a wearer.

In this case, images in corresponding ones of the front-side direction, the rear-side direction, the left-side direction, and the right-side direction are cut out from a panoramic image generated from captured images and displayed in a display image.

Figure 17:
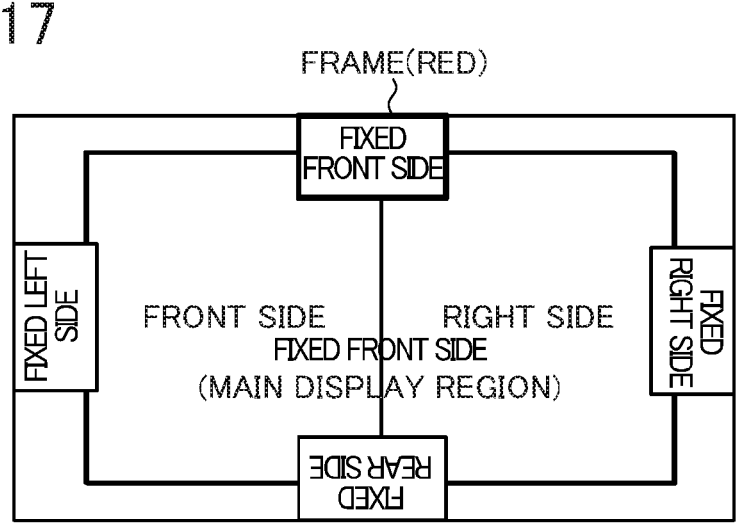
FIG. 17 is a schematic view showing an example of a relationship between a direction of a captured image and that of a display image.

FIG. 17 is a schematic view showing an example of a relationship between a direction of a captured image and that of a display image.

Referring to FIG. 17, a front-side image in a display image is generated by cutting out a part of a front-side image from a captured image and a part of a right-side image from a captured image.

By employing the aforementioned display format, an image in a direction receiving attention or an image of a subject is displayed continuously in the main display region. Even if a wearer changes an orientation, information about the direction receiving attention or information about the subject can be offered stably to the wearer in an easy-to-understand format.

[Second Modification]

In the aforementioned embodiments, the display control apparatus 1 is described as an apparatus including the display 18a covering one eye of a wearer. Alternatively, the display control apparatus 1 can include the displays 18a covering both eyes. Specifically, the display control apparatus 1 can be configured to include the displays 18a covering the right eye and the left eye of a wearer to make each of the right and left eyes visually recognize images. In this case, the display image generation unit 54 can display images in various formats in a display region for a right eye and a display region for a left eye.

For example, the display image generation unit 54 can display an image in the display region for a right eye that is in a direction responsive to change in the orientation of the head of a wearer as in the first or second embodiment.

Further, the display image generation unit 54 can fixedly display a front-side image in the display region for a left eye as in the first modification. If the situation detection unit 53 estimates a moving direction of a dangerous person or a dangerous object and estimates that the moving direction of the dangerous person or the dangerous object is a rightward direction, the display image generation unit 54 can display an image including the dangerous person or the dangerous object in the display region for a right eye and can display an image in a direction of a moving destination of the dangerous person or the dangerous object. If the moving direction of the dangerous person or the dangerous object is estimated to be a leftward direction, an image including the dangerous person or the dangerous object can be displayed in the display region for a right eye and an image in a direction of a moving destination of the dangerous person or the dangerous object can be displayed in the display region for a left eye.

As a result of the aforementioned processing, various types of useful information can be offered to a wearer as circumstances demand.

[Third Modification]

In the aforementioned embodiments, the situation detection unit 53 determines whether or not a wearer is moving toward a direction of a dangerous person or a dangerous object (whether or not the amount of movement of a position (or moving speed) exceeds a predetermined threshold). If the wearer is determined to be moving toward the direction of the dangerous person or the dangerous object, the wearer is considered to be approaching or chasing the dangerous person or the dangerous object and a switch can be made to a display of supporting the wearer.

More specifically, a front-side image is the only image required for approaching or chasing the dangerous person or the dangerous object. Thus, the display image generation unit 54 can display an abnormal site in the front-side image in a zoomed-in fashion in the main display region without displaying images in the other directions.

By providing the display control apparatus 1 with map data, etc., a movable route such as a road or a path can be decided. By indicating a direction where a dangerous person or a dangerous object can move with an arrow, for example, a wearer can be notified of the movement of the dangerous person or the dangerous object.

The display control apparatus 1 of the aforementioned configuration includes the output unit 18, the image acquisition unit 51, the behavior detection unit 52, the situation detection unit 53, the display image generation unit 54, and the display control unit 55.

The image acquisition unit 51 acquires a plurality of captured images in different image capture directions that change in a linkage relationship with behavior of a person.

The behavior detection unit 52 or the situation detection unit 53 detects behavior of the person or a moving situation of an image of a subject in the captured images acquired by the image acquisition unit 51.

The display image generation unit 54 and the display control unit 55 execute control to produce an output so as to make the output unit 18, which changes a direction of a display thereon in a linkage relationship with the behavior of the person in a manner that allows visual recognition by the person, make a switch to any of the captured images acquired by the image acquisition unit 51 and display the switched captured image in response to the behavior of the person or the moving situation of the image of the subject detected by the behavior detection unit 52 or the situation detection unit 53.

Thus, a switch is made to an intended captured image and this captured image is displayed on the output unit 18 in response to behavior of a person wearing the display control apparatus 1 or a moving situation of a subject in a captured image.

This makes it possible to respond to abnormality more promptly.

The display control apparatus 1 further includes the situation detection unit 53.

The situation detection unit 53 determines whether or not a moving situation of an image of a subject in each of a plurality of captured images is abnormal.

The display image generation unit 54 and the display control unit 55 execute control to produce an output so as to make the output unit 18 make a switch to a captured image including the moving situation of the image of the subject determined to be abnormal by the situation detection unit 53 and display the switched captured image.

Thus, a direction where the abnormality has occurred and the detail of the abnormality can be displayed in an easy-to-understand format.

If determining that a moving situation of an image of a subject is abnormal, the situation detection unit 53 detects a moving direction of the image of the subject.

The display image generation unit 54 and the display control unit 55 execute control to produce an output so as to display a captured image to be switched and displayed by the output unit 18 while flipping the captured image from side to side in response to the moving direction of the image of the subject detected by the situation detection unit 53.

Thus, the captured image is displayed while being flipped from side to side in response to the moving direction of the subject where the abnormality is detected.

This allows a wearer to intuitively understand which one of a right side and a left side the wearer should watch out for.

The behavior detection unit 52 determines whether or not behavior of a human body to be detected is sudden behavior that exceeds a predetermined threshold.

The display image generation unit 54 and the display control unit 55 execute control to produce an output so as to make the output unit 18 make a switch to the output and display the output in a manner that differs in response to a result of the determination by the behavior detection unit 52.

Thus, if a wearer exhibits sudden behavior, control different from normal display switching is executed to allow execution of control for preventing reduction in viewability.

The situation detection unit 53 determines whether or not the amount of movement of the position of a human body exceeds a predetermined threshold.

The display image generation unit 54 and the display control unit 55 execute control to produce an output in response to a result of the determination by the situation detection unit 53 different from control to produce an output so as to make the output unit 18 make a switch to the output and display the output.

This makes it possible to provide a display of supporting a wearer who is trying to approach abnormality, for example.

The display image generation unit 54 processes a plurality of captured images so as to maintain image capture directions of the captured images set in advance in response to behavior of a human body detected by the behavior detection unit 52.

The display control unit 55 executes control to produce an output so as to make the output unit 18 display the images processed by the display image generation unit 54.

Thus, an image in a direction receiving attention is displayed continuously in the same display region, so that information about the direction receiving attention can be offered to a wearer in an easy-to-understand format.

The display control unit 55 executes control to produce an output so as to make the output unit 18 display a plurality of captured images side by side. Further, the display control unit 55 executes control to produce an output in response to behavior of a person detected by the behavior detection unit 52 so as to make the output unit 18 make a switch to one of the captured images and display the switched captured image in a manner that allows the switched captured image to be distinguished from the other captured image.

Thus, the condition of the periphery of a wearer can be displayed in an easy-to-understand format.

The display control unit 55 executes control to produce an output so as to display a captured image while flipping the captured image from side to side in response to an image capture direction of the captured image to be switched and displayed by the output unit 18.

This allows a wearer to intuitively understand which one of a right side and a left side the wearer should watch out for.

The output unit 18 includes two display regions visually recognizable independently by corresponding ones of the both eyes of a person. The display control unit 55 executes control to produce an output so as to make a switch and provide different displays in the two display regions in response to behavior of a person detected by the behavior detection unit 52.

Thus, various types of useful information can be offered to a wearer as circumstances demand.

The display control apparatus 1 includes the image capture units 16a to 16d.

The image capture units 16a to 16d capture images in different directions.

The image acquisition unit 51 acquires the captured images captured by the image capture units 16a to 16d.

The output unit 18 and the image capture units 16a to 16d are integral with the display control apparatus 1.

The display control apparatus 1 is installed on a human body. Directions of image captured by the image capture units 16a to 16d and a direction of a display on the output unit 18 change in a linkage relationship with behavior of the human body.

Thus, in the display control apparatus 1 including the image capture units 16a to 16d and the output unit 18 integral with the display control apparatus 1, a switch is made to an intended captured image and the intended captured image is displayed on the output unit 18 in response to behavior of a person wearing the display control apparatus 1 or a moving situation of a subject in a captured image.

This makes it possible to respond to abnormality more promptly.

It should be noted that the present invention is not to be limited to the aforementioned embodiments but modifications, improvements, etc. within a scope that can achieve the object of the present invention are included in the present invention.

In the description of the aforementioned embodiments, the four image capture units 16a to 16d are provided. Meanwhile, as long as a necessary angle of view can be ensured, the number of image capture units can be three or less. Alternatively, five or more image capture units may be provided.

In the description of the aforementioned embodiments, the display control apparatus 1 is configured as a light-transmitting head-mounted display of a compact projector system. The display control apparatus 1 can also be configured as a light-transmitting head-mounted display that provides a stereoscopic display using holography. These light-transmitting head-mounted displays are also called a virtual projection system. Alternatively, the display control apparatus 1 can be configured as a head-mounted display of a retinal projection system of projecting an image directly on a retina using laser light. The display control apparatus 1 can also be configured as a video-transmitting head-mounted display (video see-through system).

If the display control apparatus 1 is configured as a video-transmitting head-mounted display, by wearing the display control apparatus 1, an external condition can be viewed on the display while external scenery cannot be recognized visually.

In the aforementioned embodiments, the display control apparatus 1 is described as including the helmet-type body 1A. However, this is not the only case. For example, the body of the display control apparatus 1 can be configured as a headband body. Alternatively, the display control apparatus 1 can be configured as an eyeglass-type unit provided with an image capture unit. If being configured as the eyeglass-type unit, the display control apparatus 1 can be realized in the form of what is called smartglasses.

In the aforementioned embodiments, the image capture units 16a to 16d and the display 18a are described as being integral with the display control apparatus 1. However, this is not the only case. Both directions of image captured by the image capture units 16a to 16d and a direction of a display on the display 18a, or either the directions of the image captures or the direction of the display, is required to change in a linkage relationship with behavior of a person. Thus, both the image capture units 16a to 16d and the display 18a, or either the image capture units 16a to 16d or the display 18a, may be separated from the body of the display control apparatus 1, for example.

In the description of the aforementioned embodiments, images in the periphery of a wearer to be captured extend over a horizontal direction. However, this is not the only case. For example, an image of an upper side of a wearer and that of a lower side of the wearer may be captured. Then, the situation detection unit 53 may detect a specific situation or the display image generation unit 54 may generate a display image in further consideration of these captured images. In this case, the display image to be displayed includes the image of the upper side and that of the lower side in addition to an image of a front side, that of a rear side, that of a left side, and that of a right side. In this way, an image of a periphery can be displayed in three-dimensional directions.

The display control apparatus 1 according to the present invention is usable not only for the purpose of surveillance for example by a security guard but is also usable as a technique of allowing a general user to detect abnormality mainly in outdoor space occurring outside the field of view of the user.

In the aforementioned embodiments, a head-mounted display is described as an example of the display control apparatus 1 to which the present invention is applied. However, the display control apparatus 1 is not particularly limited to the head-mounted display.

For example, the present invention is applicable to common electronic devices having a display function. More specifically, for example, the present invention is applicable to notebook personal computers, television receivers, video cameras, portable navigation devices, portable telephones, smartphones, handheld game consoles, etc.

The processing sequence described above can be executed by hardware, and can also be executed by software.

In other words, the functional structure shown in FIG. 3 is merely an illustrative example, and the present invention is not particularly limited to this structure. Specifically, as long as the display control apparatus 1 has a function enabling the aforementioned processing sequence to be executed in its entirety, the types of functional blocks employed to realize this function are not particularly limited to the example shown in FIG. 3.

In addition, a single functional block may be configured by a single hardware piece, may be configured by a single installation of software, or may be configured by any combination thereof.

If the processing sequence is to be executed by software, a program configuring the software is installed from a network or a storage medium into a computer, for example.

The computer may be a computer embedded in dedicated hardware. Alternatively, the computer may be a computer capable of executing various functions by means of installation of various programs such as a general-purpose personal computer, for example.

The storage medium containing such programs not only can be constituted by the removable medium 31 shown in FIG. 2 distributed separately from the body of the apparatus in order to supply the programs to a user, but also can be constituted by a storage medium or the like supplied to the user in a state incorporated in the body of the apparatus in advance. The removable medium 31 is for example formed of a magnetic disk (including a floppy disk), an optical disk, or a magneto-optical disk. The optical disk is for example formed of a compact disk-read only memory (CD-ROM), a digital versatile disk (DVD), or a Blu-ray (registered trademark) disk (Blu-ray Disk). The magneto-optical disk is for example formed of Mini-Disk (MD). The storage medium supplied to the user in a state incorporated in the body of the apparatus in advance is for example formed of the ROM 12 shown in FIG. 2 storing a program or a hard disk included in the storage unit 20 shown in FIG. 2.

It should be noted that, in the present specification, the steps describing the program recorded in the storage medium include not only processes executed in a time-series manner according to the order of the steps, but also processes executed in parallel or individually and not always required to be executed in a time-series manner.

While some embodiments of the present invention have been described above, these embodiments are merely exemplifications, and are not to limit the technical scope of the present invention. Various other embodiments can be employed for the present invention, and various modifications such as omissions and replacements are applicable without departing from the spirit of the present invention. Such embodiments and modifications are included in the scope of the invention and the summary described in the present specification, and are included in the invention recited in the claims as well as in the equivalent scope thereof.

What is claimed is:

1. A display control comprising:
   a body which is wearable on a head of a person;
   a display which is provided on the body so as to be viewable by the person while the body is worn on the head of the person;
   a plurality of image capture units which are provided on the body and which capture images in different directions; and
   a processor that is configured to:
      acquire, from the image capture units, a plurality of captured images having different image capture directions that change in accordance with a movement of the person while the body is worn on the head of the person;
      detect a moving situation of an image of a subject in the acquired captured images;
      determine whether or not the moving situation of the image of the subject in each of the acquired captured images corresponds to a predetermined specific situation;
      execute control to produce an output so as to switch to one of the acquired captured images that includes the moving situation of the image of the subject having been determined to correspond to the predetermined specific situation, and to display the switched-to captured image on the display;
      further detect a moving direction of the image of the subject when the moving situation of the image of the subject is determined to correspond to the predetermined specific situation; and
      execute control to display the switched-to captured image on the display while flipping the switched-to captured image from side to side in response to the detected moving direction of the image of the subject.

2. The display control apparatus according to claim 1, wherein the image capture units are provided at respective positions that allow capture of an omnidirectional image, and
   wherein the processor is configured to execute the control to display the switched-to captured image on the display while flipping the switched-to captured image from side to side when the detected moving direction of the image of the subject is (i) from a rear side toward the rear side or (ii) from the rear side toward a front side, relative to an orientation of the head of the person.

3. A display control apparatus comprising:
   a body which is wearable on a head of a person;
   a display which is provided on the body so as to be viewable by the person while the body is worn on the head of the person;
   a plurality of image capture units which are provided on the body and which capture images in different directions; and
   a processor that is configured to:
      acquire, from the image capture units, a plurality of captured images having different image capture directions that change in accordance with a movement of the person while the body is worn on the head of the person;
      detect a behavior of the person;
      execute control to produce an output so as to switch to one of the acquired captured images, and to display the switched-to captured image on the display in response to the detected behavior of the person;
      further determine whether or not the detected behavior of the person is sudden behavior that exceeds a predetermined threshold; and
      execute control to prevent a sudden switch when switching to display the switched-to captured image on the display, in response to a result of the determination about the behavior.

4. The display control apparatus according to claim 3, wherein the processor is configured to execute the control to prevent the sudden switch by temporarily pausing switching in response to the result of the determination about the behavior.

5. A display control apparatus comprising:
a body which is wearable on a head of a person;
a display which is provided on the body so as to be viewable by the person while the body is worn on the head of the person;
a plurality of image capture units which are provided on the body and which capture images in different directions; and
a processor that is configured to:
  acquire, from the image capture units, a plurality of captured images having different image capture directions that change in accordance with a movement of the person while the body is worn on the head of the person;
  detect a behavior of the person;
  process the acquired captured images so as to generate a display image having one of predetermined image capture directions in response to the detected behavior of the person, the predetermined image capture directions being fixed image capture directions that are independent of the detected behavior of the person; and
  execute control to display the generated display image on the display.

6. The display control apparatus according to claim 5, wherein the image capture units are provided at respective positions that allow capture of an omnidirectional image, and
wherein the processor is configured to generate the display image having the one of the predetermined image capture directions by processing adjacent ones of the acquired captured images.

7. A display control apparatus comprising:
a body which is wearable on a head of a person;
a display which is provided on the body so as to be viewable by the person while the body is worn on the head of the person;
a plurality of image capture units which are provided on the body and which capture images in different directions; and
a processor that is configured to:
  acquire, from the image capture units, a plurality of captured images having different image capture directions that change in accordance with a movement of the person while the body is worn on the head of the person;
  detect a behavior of the person;
  further determine whether or not the detected behavior of the person is sudden behavior that exceeds a predetermined threshold; and
  execute control to display the acquired captured images side by side on the display and further, in response to a result of the determination about the detected behavior of the person, execute control to switch to one of the acquired captured images and to display the switched-to captured image on the display in a manner that allows the switched-to captured image to be distinguished from others of the captured images.

8. A display control apparatus comprising:
a body which is wearable on a head of a person;
a display which is provided on the body so as to be viewable by the person while the body is worn on the head of the person;
a plurality of image capture units which are provided on the body and which capture images in different directions; and
a processor that is configured to:
  acquire, from the image capture units, a plurality of captured images having different image capture directions that change in accordance with a movement of the person while the body is worn on the head of the person;
  detect (i) a behavior of the person or (ii) a moving situation of an image of a subject in the acquired captured images; and
  execute control to produce an output so as to switch to one of the acquired captured images, and to display the switched-to captured image on the display in response to the detected behavior of the person or the detected moving situation of the image of the subject,
wherein the processor is configured to execute the control to display the switched-to captured image while flipping the switched-to captured image from side to side when an image capture direction of the switched-to captured image is a direction facing a rear side of the person.

9. A display control apparatus comprising:
a body which is wearable on a head of a person;
a display which is provided on the body so as to be viewable by the person while the body is worn on the head of the person;
a plurality of image capture units which are provided on the body and which capture images in different directions; and
a processor that is configured to:
  acquire, from the image capture units, a plurality of captured images having different image capture directions that change in accordance with a movement of the person while the body is worn on the head of the person;
  detect (i) a behavior of the person or (ii) a moving situation of an image of a subject in the acquired captured images; and
  execute control to produce an output so as to switch to one of the acquired captured images, and to display the switched-to captured image on the display in response to the detected behavior of the person or the detected moving situation of the image of the subject,
wherein the display includes two display regions visually recognizable independently by corresponding ones of eyes of the person, and
wherein the processor is further configured to:
  detect a moving direction of the image of the subject; and
  execute control to produce an output so as to provide different displays in the two display regions in response to the detected moving direction of the image of the subject.

10. A display control apparatus comprising:
a body which is wearable on a head of a person;
a display which is provided on the body so as to be viewable by the person while the body is worn on the head of the person;
a plurality of image capture units which are provided on the body and which capture images in different directions that change in accordance with movement of the person when the body is worn on the head of the person, the image capture units being provided at respective positions that allow capture of an omnidirectional image; and a processor that is configured to:
acquire an omnidirectional image captured by the image capture units;
detect (i) a behavior of the person or (ii) a moving situation of an image of a subject in the acquired captured images; and
execute control to produce an output so as to make a switch to a part of the acquired omnidirectional image and to display the switched-to part of the acquired omnidirectional image on the display, in response to the detected behavior of the person or the detected moving situation of the image of the subject.

* * * * *